United States Patent

[11] 3,625,437

| [72] | Inventor | Gerard Claude Garrigou<br>Ville D'Avray, France |
|---|---|---|
| [21] | Appl. No. | 851,830 |
| [22] | Filed | Aug. 21, 1969 |
| [45] | Patented | Dec. 7, 1971 |
| [73] | Assignee | Deutsche Prazisions-Ventil GmbH<br>Hattersheim/Main, Germany |
| [32] | Priority | Aug. 24, 1968 |
| [33] | | Germany |
| [31] | | P 17 75 543.0 |

[54] SPRAY HEAD FOR A PRESSURIZED CONTAINER
7 Claims, 4 Drawing Figs.

[52] U.S. Cl. .................................................. 239/469,
239/463, 239/492, 239/596
[51] Int. Cl. .................................................. B05b 1/34
[50] Field of Search .......................................... 239/491,
492, 596, 463, 468, 469

[56] References Cited
UNITED STATES PATENTS

| 3,075,708 | 1/1963 | Cooprider .................. | 239/468 X |
| 3,112,074 | 11/1963 | Green .......................... | 239/463 X |
| 3,240,431 | 3/1966 | Hug et al. ................... | 239/463 X |

Primary Examiner—Lloyd L. King
Assistant Examiner—Reinhold W. Thieme
Attorney—Davis, Hoxie, Faithfull & Hapgood ABSTRACT: A spray head for a pressurized container, said head having a recess and a pin extending from the bottom of the recess, and also having a cup-shaped nozzle insert which is inserted into the recess and placed over the pin, the end of the pin and the bottom of the insert resting against the pin defining a swirl-chamber system, and the outer lateral surface of the insert together with the lateral surface of the recess forming a first pair of cooperating surfaces, while the inner lateral surface of the insert together with the lateral surface of the pin forms a second pair of cooperating surfaces.

PATENTED DEC 7 1971　　　　　　　　　　　　　　　　　3,625,437

SPRAY HEAD FOR A PRESSURIZED CONTAINER

The present invention relates to a spray head for a pressurized container, said head having a recess and a pin extending from the bottom of the recess, and also having a cup-shaped nozzle insert which is inserted into the recess and placed over the pin, the end of the pin and the bottom of the insert resting against the pin defining a swirl-chamber system, and the outer lateral surface of the insert together with the lateral surface of the recess forming a first pair of cooperating surfaces, while the inner lateral surface of the insert together with the lateral surface of the pin forms a second pair of cooperating surfaces.

The swirl-chamber system consists, for instance, of a cylindrical swirl chamber which is arranged concentric to a nozzle opening, and one or more channels which are directed tangentially into the swirl chamber. The chamber and channels are, as a rule, formed by depressions in the inner surface of the bottom wall of the nozzle insert, in the end surface of the pin, or in both, and are covered by another cooperating part. It is of importance for the inner, bottom surface of the insert and the end surface of the pin to be in complete and accurate contact with each other and that the insert and pin be coaxial. Even small deviations in the aforesaid respects lead to a considerable impairment of the spray characteristics, either because ill-defined flow paths are produced or because the channel cross sections or the channel lengths vary, or because asymmetries occur, especially when several tangential channels are provided.

There is already known a swirl spray device in which the outer lateral surface of the insert has a forced fit in the recess and the inner lateral surface of the insert has a forced fit with the lateral surface of the pin. The recess may have a front circumferential bead in order to increase the forced-fit engagement. The end of the pin is approximately adjacent the outer edge of the recess or is adjacent the circumferential bead or extends beyond same.

Such a spray head construction leads in mass production to a number of inadequacies, since the parts to be assembled are very small (for instance, the pin has a diameter of 2-3 mm. and the insert has a diameter of 3-5 mm.) and the insertion of the insert takes place with relatively high speed. One main source of disturbance is that the insert is not introduced into the recess precisely coaxially therewith. As a result the pin is damaged and particles abraded off may partially clog the flow channels; also the pin is shifted in position so that the desired parallelism and concentricity are not obtained. The same defects are also caused by a pin which has been distorted after removal from the manufacturing mould due to gravity, thermal stresses or the like, this being frequently true when the parts are made of plastic material. In extreme cases, and particularly when both defects occur simultaneously, the introduction itself of the insert into the recess is endangered.

However, even in the known devices, optimum spray characteristics can be obtained by presorting of the individual parts and careful assembly. In this case, however the cost of manufacture is unreasonably increased.

The object of the present invention is to reduce the percentage of defects in the aforementioned swirl spray devices, despite the inaccuracy which is unavoidable in low cost, mass production, and in particular to ensure that substantially all spray heads of a batch have an optimum spray characteristic.

This purpose is achieved in accordance with the invention by such a shape and arrangement of the aforesaid two pairs of forced fit surfaces that upon insertion of the insert into the recess the insert is guided by the first pair of surfaces parallel to the central axis of the recess before engagement of the second pair of surfaces.

With such a construction, it is immaterial whether the insert is introduced precisely parallel or somewhat obliquely into the recess, since during the first part of the insertion movement, the insert is automatically aligned. It is only after this that the insert comes into contact with the pin. Therefore, it is not possible for the pin to be damaged or shifted in position due to oblique introduction of the insert. Furthermore, the insert has a precisely concentric position in the recess and its bottom wall lies exactly perpendicular to the central axis of the recess. Accordingly, in combination with a straight pin, there is obtained a swirl chamber system which fully satisfies all requirements.

In a first embodiment of the invention, the end surface of the pin lies so far within the recess that its distance from the outer edge of the recess is at least equal to a substantial part, and preferably more than 50 percent of the depth of the insert. With this construction, the recess extends beyond the pin by such an amount that proper alignment of the insert is ensured, even upon oblique insertion, before it comes into contact with the pin. Furthermore, in this way the length of the pin can be substantially shortened. Accordingly, it has less tendency to bend, so that swirl-chamber systems which operate accurately and with great reliability can be produced.

Furthermore, it is preferable for the material of the insert to be harder and less elastic than the material of the body part of the spray head and essential for the said distance (referred to in the preceding paragraph) to be greater than the greatest thickness of the bottom of the insert. Accordingly, when the insert is being forced into the recess, the lateral surface of the latter serving for the initial guiding of the insert first yields to the pressure of the insert, but recovers after full introduction of the insert so that the zone of the said lateral surface between the bottom of the insert and the mouth of the recess becomes somewhat bowed towards the axis of the recess and thus holds the insert securely in position. It is thus not necessary to employ a securing bead or the like between the recess and the insert. However, such a securing means can be provided.

It is preferable to give the recess a uniform cross section from its mouth to its bottom. In this way, the recess, has the greatest possible depth, and a relatively long portion of this surface may be used for the initial aligning of the insert.

In one practical embodiment of the invention, it has proved advantageous for the end surface of the pin to be located approximately halfway up the recess. In such a case, the insert is guided practically over its entire depth before it comes into contact with the pin.

In a second preferred embodiment, which can also be combined with the first embodiment, the lateral inner surface of the insert has an oblique directing surface which extends over at least a substantial part of the inside depth of the insert and defines a boundary cross section which at the outer end of the oblique surface is greater than the cross section of the pin and which gradually diminishes to a cross section which is substantially equal to the cross section of the pin. Accordingly, the insert can be pushed a considerable distance into the recess of the spray head and thereby aligned before the pin is contacted. In addition to this, however, distorted pins become straightened by the oblique directing surface. Since the oblique directing surface is relatively long, the straightening correction takes place gradually so that no damage to the pin occurs. At the end of the insertion movement the pin becomes accurately centered by the insert after this has itself become aligned. The expression "substantially equal to the pin cross section" referred to above permits tolerances of such value that the concentricity and parallelism of the end surface of the pin and the bottom of the insert are not substantially affected and, therefore, for instance differences in tolerance of ±0.1 mm. can be accepted. The required length of the oblique directing surface depends on specific circumstances. For a careful and gradual aligning of the pin by insert, a large length is advisable, which length, in the most favorable case, will be equal to the inner depth of the insert. As a rule, the oblique directing surface will extend, however, at least over one-third of this depth.

The oblique directing surface preferably ends at the bottom of the insert. This means that only the outer end of the lateral surface of the pin belongs to the aforesaid second pair of cooperating surfaces. Furthermore, with this development, the insert can be introduced relatively deeply into the recess before it comes into contact with the pin.

In actual practice, an oblique directing surface which is at an angle of less than 30°, and preferably less than 20°, to the central axis of the insert has proved favorable.

In a further development of the invention, the insert can bear on its inside lateral wall at least three ribs which together constitute the oblique directing surface. These ribs are sufficient for the aligning of the pin. The space between the ribs can be used for the flow of product. The insert can have a substantially uniform wall thickness and can therefore be made as a plastic extrusion free from internal stresses liable to cause deformation.

In the simplest case, the lateral surface of the recess, the outer lateral surface of the insert and the lateral surface of the pin are substantially cylindrical, while the inner lateral surface of the insert describes a circle in every cross-sectional plane. With this construction, it is not necessary to observe any specific angular position upon introduction of the insert into the recess. Instead of the above-described ribs, the inner lateral surface of the insert can consist, for instance, of a conical surface, which may be formed with grooves.

The invention will now be described in detail with reference to an embodiment shown by way of example in the accompanying drawings, in which.

Figure 1:
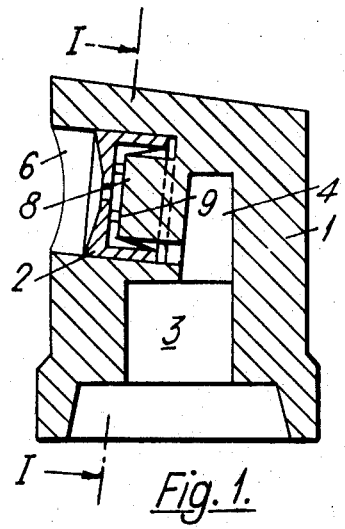
FIG. 1 is a longitudinal section of the spray head complete with a nozzle insert.
Figure 4:
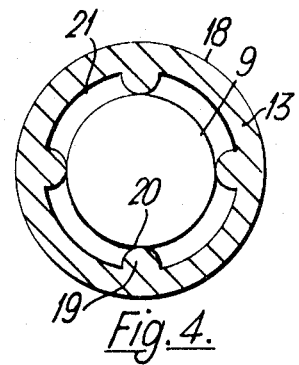
FIG. 4 is an enlarged sectional view of the insert taken on the line I—I, FIG. 1.
Figure 2:
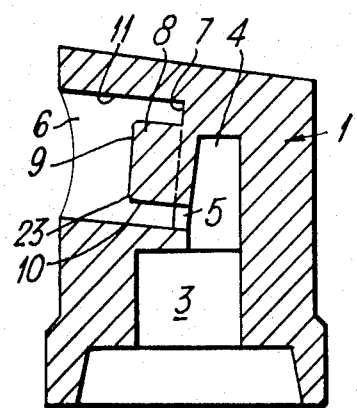
FIG. 2 is a view similar to FIG. 1 with the insert removed.
Figure 3:
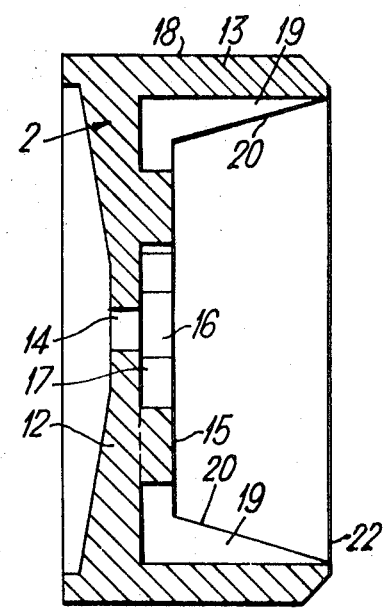
FIG. 3 is a cross-sectional view of the insert on an enlarged scale.

The spray head consists of two parts, namely a body part 1 and a nozzle insert 2. The body part has a cylindrical recess 3 for receiving in known manner, a hollow valve stem projecting from the top of a spray can. The inner end of the recess 3 communicates with a space 4 which is connected via an opening 5 with a cylindrical recess 6 in the lateral wall of the body part 1. A cylindrical pin 8 extends outwardly from the bottom 7 of the recess, the flat end surface 9 of the pin being perpendicular to its central axis and its cylindrical lateral surface 10 being concentric with the surface 11 of the recess 6.

The nozzle insert 2 is cup-shaped; it has a bottom wall 12 and a lateral wall 13. A nozzle opening 14 is provided in the center of the bottom wall 12. The inner surface 15 of the bottom wall is flat and is perpendicular to the central axis of the insert. This inner surface has recesses consisting of a cylindrical depression 16 forming a swirl chamber and tangentially adjoining grooves 17 which form the feed channels to the swirl chamber. The outer surface 18 of the insert 2 is cylindrical. Four ribs 19 are provided on the inner lateral surface of the wall 13, the faces of said ribs forming the oblique directing surface 20 of the insert and extending obliquely over the entire depth of the inside of the insert. In use of the spray head, the product to be sprayed flows through the intervening spaces 21.

In the present example, the pin 8 has a length equal to about 50 percent of the depth of the recess 6. The depth of the insert 2 is slightly greater than said length. The outside diameter of the insert 2 is so much larger than the diameter of the recess 6 that a dependable forced fit occurs when the insert is pushed into the recess. The diameter of the circle circumscribed by the oblique surface 20 where it meets the inner surface 15 of the bottom wall 12 is equal to the diameter of the pin 8 with a tolerance of ±0.05 mm. The diameter of the circle circumscribed by the oblique surface at the outer edge 22 of the insert is so much larger than the diameter of the pin 8 that even with the maximum, expected distortion of the pin 8, the oblique surface 20 can be inserted into the gap between the pin and the lateral surface 11 of the recess. The oblique surface 20 is at an angle of about 20° to the central axis of the insert.

Upon assembly, the insert 2 is introduced into the recess 6. During the first portion of the insertion movement, a first pair of surfaces consisting of the outer lateral surface 18 of the insert 2 and the surface 11 of the recess 6 cooperate, since the pin 8 is set back and the inner lateral surface of the insert 2 extends obliquely. The insert is therefore substantially completely inserted into the recess before it can come into contact with the pin 8. In the event of the insert being presented obliquely by the assembly tool, it becomes accurately aligned during insertion, i.e., it becomes concentrically arranged in the recess 6 and the inner surface 15 of the bottom wall 12 becomes precisely perpendicular to the central axis of the recess. In the further insertion movement, the oblique surface 20 strikes against the edge region 23 of the outer surface 10 of the pin. The oblique surface 20 and the edge region 23 therefore form a second pair of cooperating surfaces. If the pin 8 is precisely straight, the edge region 23 is reached only upon the completion of the insertion movement. However, if the pin is distorted, then engagement between the edge region 23 and one or more ribs 19 takes place earlier, the pin being straightened during the further insertion movement.

Since the insert has become accurately aligned when it comes into engagement with the pin and since the pin is also accurately aligned and centered by the oblique surfaces 20, the end surface 9 of the pin finally covers the inside surface 15 of the bottom wall 12 and lies flat and concentric. Consequently, with a given batch of spray heads, the swirl-chamber system formed after assembly has precisely the dimensions stipulated in the design and substantially the same characteristics, despite variations that are unavoidable in mass production.

The parts used preferably consist of plastics material. However, they may also consist of metal. The depressions 16, 17 can be located in the bottom wall 12, in the end surface 9 of the pin, or in both.

The plastics material of the body part 1 is preferably softer and more elastic than that of the insert 2. Accordingly, when the insert 2 is being forced into the recess 6, the lateral surface 11 of the latter serving for the initial guiding of the insert first yields to the pressure of the insert, but recovers after full introduction of the insert so that the zone of the said lateral surface between the bottom of the insert and the mouth of the recess becomes somewhat bowed towards the axis of the recess and thus holds the insert securely in position. It is thus not necessary to employ a securing bead or the like between the recess and the insert.

I claim:

1. In a spray head for a pressurized container, the head comprising a body part which has a recess and a pin extending from the bottom of the recess a distance substantially less than the depth of the recess and a cup-shaped nozzle insert which is inserted into the recess and pushed over the pin, the end of the pin and the adjoining bottom wall of the insert defining therebetween a swirl-chamber system, the improvement which comprises the outer surface of the insert and the wall of the recess forming a first pair of cooperating surfaces, the inner surface of the insert and the outer surface of the pin forming a second pair of cooperating surfaces, the two pairs of cooperating surfaces being arranged so that the insert is guided into parallelism with the pin axis by the first pair of cooperating surfaces before engagement of the second pair of cooperating surfaces, the inner surface of the insert having oblique directing surfaces for guiding the insert during insertion extending over at least a substantial part of the inner depth of the cup cavity of the insert, said directing surfaces defining a cup cavity which gradually converges inwardly toward the bottom wall from a width greater than the width of the pin to a width substantially equal to the width of the pin.

2. The improvement of claim 1 wherein the material of the insert is harder and less elastic than the material of the body part.

3. The improvement of claim 1 wherein the recess has a uniform width from its mouth to the bottom wall.

4. In a spray head for a pressurized container, the head comprising a body part which has a recess and a pin extending from the bottom of the recess and a cup-shaped nozzle insert which is inserted into the recess and pushed over the pin, the end of the pin and the adjoining bottom wall of the insert defining thereibetween a swirl-chamber system, the improvement which comprises the outer surface of the insert consisting entirely of a uniform cylinder a cylindrical recess, the wall of the recess and the outer surface of the insert forming a first pair of cooperating surfaces, the inner surface of the insert and the outer surface of the pin forming a second pair of cooperating surfaces, the two pairs of cooperating surfaces being arranged so that the insert is guided into parallelism with the pin axis by the first pair of cooperating surfaces before engagement of the second pair of cooperating surfaces, the inner surface of the insert having oblique directing surfaces for guiding the insert during insertion extending over at least a substantial part of the inner depth of the cup cavity of the insert, said directing surfaces defining a cup cavity which gradually converges inwardly toward the bottom wall from a width greater than the width of the pin to a width substantially equal to the width of the pin, and wherein the insertion of the insert is arrested entirely by the abutment of the pin with the bottom wall of the insert.

5. The improvement of claim 4, wherein the oblique directing surface terminates at one end at the bottom of the insert.

6. The improvement of claim 4, wherein the oblique directing surface is at an angle of less than 30° to the central axis of the insert.

7. The improvement of claim 4, wherein the insert bears on its inner, lateral wall at least three ribs, the inwardly directed faces of which constitute together said oblique surface.

* * * * *